United States Patent
Venkatesan et al.

(10) Patent No.: US 12,499,563 B2
(45) Date of Patent: Dec. 16, 2025

(54) METHOD AND ELECTRONIC DEVICE FOR OBTAINING RECONSTRUCTED IMAGE

(71) Applicant: Samsung Electronics Co., Ltd., Suwon-si (KR)

(72) Inventors: Shankar M Venkatesan, Bengaluru (IN); Himanshu Pandotra, Bengaluru (IN); Paritosh Mittal, Bengaluru (IN); Viswanath Veera, Bengaluru (IN); Aloknath De, Bengaluru (IN); Rohith C Aralikkatti, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 385 days.

(21) Appl. No.: 17/863,820

(22) Filed: Jul. 13, 2022

(65) Prior Publication Data

US 2022/0375109 A1    Nov. 24, 2022

Related U.S. Application Data

(63) Continuation of application No. PCT/KR2022/007229, filed on May 20, 2022.

(30) Foreign Application Priority Data

May 20, 2021 (IN) .............................. 202141022636
Jul. 14, 2021 (IN) .............................. 2021 41022636

(51) Int. Cl.
   *G06T 7/33*    (2017.01)
   *G06N 3/045*   (2023.01)

(52) U.S. Cl.
   CPC ............. *G06T 7/337* (2017.01); *G06N 3/045* (2023.01); *G06T 2207/10012* (2013.01); *G06T 2207/20084* (2013.01)

(58) Field of Classification Search
   CPC ........... G06T 7/337; G06T 2207/10012; G06T 2207/20084; G06T 5/60; G06T 5/77;
   (Continued)

(56) References Cited

U.S. PATENT DOCUMENTS 9,390,532 B2   7/2016  Hyvarinen
9,430,806 B2   8/2016  Na et al.
(Continued)

FOREIGN PATENT DOCUMENTS

CN       105827952 A    8/2016
JP       2019-083389 A  5/2019
(Continued)

OTHER PUBLICATIONS

Learning to See Through Obstructions, by Yu-Lun Liu, Wei-Sheng Lai, Ming-Hsuan Yang, Yung-Yu Chuang, Jia-Bin Huang, 2020 IEEE/CVF Conference on Computer Vision and Pattern Recognition (CVPR) (2020, pp. 14203-14212), Jun. 1, 2020 (Year: 2020).*
(Continued)

*Primary Examiner* — Michael Robert Cammarata
*Assistant Examiner* — Heath E. Wells
(74) *Attorney, Agent, or Firm* — Jefferson IP Law, LLP

(57) ABSTRACT

A method for obtaining a reconstructed image is provided. The method includes capturing, by the electronic device, a first sensor image and a second sensor image including a scene and an obstruction in the scene. The method includes generating, by the electronic device, an obstruction-free first image, a first obstruction template, an obstruction-free second image and a second obstruction template. Further, determining, a parallax shift between the obstruction-free first image and the obstruction-free second image and aligning the obstruction-free second image with respect to the obstruction-free first image and the second sensor image with respect to the first sensor image using the determined
(Continued)

parallax shift. Further, the method includes determining occluded portions in the first sensor image and in the obstruction-free first image at corresponding locations in the aligned second sensor image and aligned obstruction-free second image respectively and obtaining the reconstructed obstruction-free first image.

14 Claims, 8 Drawing Sheets

(58) Field of Classification Search
CPC . G06T 2207/20081; G06T 5/50; G06N 3/045; G06N 3/08
USPC .......................................................... 382/100
See application file for complete search history.

(56) References Cited

U.S. PATENT DOCUMENTS

| | | | |
|---|---|---|---|
| 10,032,301 | B2 | 7/2018 | Balasubramanian et al. |
| 2011/0242286 | A1 | 10/2011 | Pace et al. |
| 2012/0162463 | A1 | 6/2012 | Doida |
| 2012/0262572 | A1* | 10/2012 | Cudak ....................... G06T 5/77 |
| | | | 348/222.1 |
| 2018/0075587 | A1 | 3/2018 | Swami et al. |
| 2018/0300954 | A1* | 10/2018 | Fu .......................... G06T 15/205 |
| 2018/0330470 | A1* | 11/2018 | Karki ...................... G06V 10/70 |
| 2019/0197673 | A1 | 6/2019 | Jung et al. |
| 2019/0258885 | A1* | 8/2019 | Piette ..................... G06V 10/143 |
| 2020/0036908 | A1* | 1/2020 | Rubinstein ................ G06T 5/50 |
| 2021/0097297 | A1* | 4/2021 | Ren ......................... G06N 3/047 |
| 2022/0292630 | A1* | 9/2022 | Liu ........................... G06T 7/55 |
| 2023/0061863 | A1* | 3/2023 | Li ........................ A61B 6/5258 |

FOREIGN PATENT DOCUMENTS

| | | |
|---|---|---|
| KR | 10-1436327 B1 | 9/2014 |
| WO | WO-2017206042 A1 * | 12/2017 ............... G06T 7/33 |

OTHER PUBLICATIONS

Removing fences from sweep motion videos using global 3D reconstruction and fence-aware light field rendering, by Chanya Lueangwattana, Shohei Mori, Hideo Saito, Computational Visual Media (vol. 5, Issue: 1, 2019, pp. 21-32), Mar. 1, 2019 (Year: 2019).*
Gupta et al.; Fully Automated Image De-fencing using Conditional Generative Adversarial Networks; arXiv: 1908.06837v1 [cs.CV] Aug. 19, 2019; Aug. 19, 2019; Singapore.
Indian Office Action dated Dec. 8, 2022; Indian Appln. No. 202141022636.
International Search Report with Written Opinion dated Sep. 1, 2022; International Appln. No. PCT/KR2022/007229.
Indian Hearing Notice dated May 21, 2025, issued in an India Patent Application No. 202141022636.

* cited by examiner

METHOD AND ELECTRONIC DEVICE FOR OBTAINING RECONSTRUCTED IMAGE

CROSS-REFERENCE TO RELATED APPLICATION(S)

This application is a continuation application, claiming priority under § 365(c), of an International application No. PCT/KR2022/007229, filed on May 20, 2022, which is based on and claims the benefit of an Indian provisional patent application number 202141022636, filed on May 20, 2021, in the Indian Intellectual Property Office, and of an Indian Complete patent application number 202141022636, filed on Jul. 14, 2021, in the Indian Intellectual Property Office, the disclosure of each of which is incorporated by reference herein in its entirety.

TECHNICAL FIELD

The disclosure relates to image processing. More particularly, the disclosure relates to a method and an electronic device for obtaining a reconstructed image by removing an obstruction in an image.

BACKGROUND ART

FIG. 1 illustrates examples of obstruction removal in an image using a single input image, according to the related art.

In general, referring to FIG. 1, as camera and imaging technology advances, electronic devices are capable of capturing pictures of object of interest that may be concealed behind some type of obstacle such as a fence, barricade, etc. (as shown in 101a and 101b) and processing the image to remove the obstruction. The removal of the obstruction enables a clear presentation of the object of interest to be provided. However, the removal of the obstruction may not be perfect in most scenarios. For example, a few portions of the obstruction may be left behind in an obstruction free image generated by the electronic device (as shown in 102a). In another example, portions of the object of interest which was hidden by the obstruction also may be removed with the obstruction, which will lead to loss of information associated with the object of interest (as shown in 102b).

Also, the electronic device includes an array of individual cameras. Each of the individual cameras in the array camera cooperates to provide imaging functionality in the electronic device that cannot be achieved using the individual camera. The array cameras have largely been used in stereo imaging, surround imaging and wide field-of-view (FOV) imaging applications. In the stereo imaging, two individual cameras capture a same scene from two slightly different vantage points to gain depth perception. In the surround/wide-FOV imaging, two or more individual cameras placed at a common location are configured to view different portions of the surroundings, such that the individual cameras combine to provide an extended field of view as compared to that of a single camera.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide a method and an electronic device for obtaining a reconstructed image by removing an obstruction in an image such as a fence, a reflection, etc. using input images from multiple image sensors of the electronic device and a series of deep neural network (DNN) models. The series of DNN models may be trained with a large number of training images which enhance efficiency of identification and removal of the obstruction in the image.

Another aspect of the disclosure is to reconstruct portions of the image which may be hidden behind the obstruction based on the images from multiple image sensors which capture a scene or an object from different angles or positions. Therefore, the image is not just made obstruction-free but also a quality of the reconstructed image is enhanced due to the reconstructing of occluded portions with the same portions which are visible from another camera.

Additional aspects will be set forth in part in the description which follows and, in part, will be apparent from the description, or may be learned by practice of the presented embodiments.

Technical Solution

In accordance with an aspect of the disclosure, a method for obtaining a reconstructed image in an electronic device is provided. The method includes capturing, by the electronic device, a first sensor image of a scene by a first image sensor and a second sensor image of the scene by a second image sensor, he first sensor image and the second sensor image comprising at least one portion of the scene and at least one portion of an obstruction in the scene, generating, by the electronic device, an obstruction-free first image and a first obstruction template using the first sensor image and generating, by the electronic device, an obstruction-free second image and a second obstruction template using the second sensor image. The method also includes determining, by the electronic device, a parallax shift between the obstruction-free first image and the obstruction-free second image and aligning, by the electronic device, the obstruction-free second image with respect to the obstruction-free first image using the determined parallax shift and aligning, by the electronic device, the second sensor image with respect to the first sensor image using the determined parallax shift. Furthermore, the method includes determining, by the electronic device, as guided by the obstruction locations indicated in the first obstruction template, and mapping the occluded portions in the first sensor image to the corresponding visible locations in the aligned second sensor image and the obstruction-free first image, and to the corresponding visible locations in the aligned obstruction-free second image, and obtaining, by the electronic device, a reconstructed obstruction-free first image by reconstructing the occluded portions in the first sensor image and the obstruction-free first image by referring to the same but visible portions in the aligned second sensor image and the aligned obstruction-free second image.

In an embodiment, the method may further include displaying, by the electronic device, the reconstructed obstruction-free first image on a screen of the electronic device upon at least one of completion of the capturing of the first sensor image and the second sensor image of the scene or during a camera preview of the scene, receiving, by the electronic device, a user input to modify a portion of the reconstructed obstruction-free first image, and displaying, by the electronic device, a modified reconstructed obstruction-free first image on a screen of the electronic device.

In an embodiment, the generating, by the electronic device, of the obstruction-free first image and the first obstruction template using the first sensor image may include receiving, by a first deep neural network (DNN) of the electronic device, the first sensor, generating, by the first DNN, the obstruction-free first image and a first obstruction image, and generating, by the first DNN, the first obstruction template using the first obstruction image.

In an embodiment, the generating, by the electronic device, of the obstruction-free second image and the second obstruction template using the second sensor image may include receiving, by a first DNN of the electronic device, the second sensor image, generating, by the first DNN, the obstruction-free second image and a second obstruction image, and generating, by the first DNN, the second obstruction template using the second obstruction image.

In an embodiment, the parallax shift between the obstruction-free first image and the obstruction-free second image may be determined by using a registration technique.

In an embodiment, the aligned obstruction-free second image may comprise visible pixels aligned in position with respective pixels in the obstruction-free first image, the pixels aligned in the aligned obstruction-free second image and the respective pixels in the obstruction-free first image may correspond to one of visible information in the scene or an occluded pixel in the obstruction-free first image with corresponding pixel visible in the aligned obstruction-free second image In an embodiment, the aligned second sensor image may comprise visible pixels aligned in position with respective pixels in the first sensor image, and the pixels aligned in the aligned second sensor image and the pixels in the first sensor image may correspond to one of visible information in the scene or an occluded pixel in the first sensor image with corresponding pixel visible in the aligned second sensor image.

In an embodiment, the determining, by the electronic device, of the occluded portions in the first sensor image and the obstruction-free first image using the aligned second sensor image and the aligned obstruction-free second image respectively may include receiving, by a second DNN of the electronic device, the aligned first sensor image, the aligned second sensor image, the aligned first obstruction-free image, aligned second obstruction-free image, and the first obstruction template as inputs, and determining, by the second DNN, the occluded portions in the obstruction-free first image by referring to the aligned obstruction-free second image, and the occluded portions in the first sensor image by referring to the aligned second sensor, wherein the occluded portions in the obstruction-free first image and the occluded portions in the first sensor image may be determined using the first obstruction template as guidance.

In an embodiment, the obtaining, by the electronic device, of the reconstructed obstruction-free first image by reconstructing the occluded portions in the first sensor image and the obstruction-free first image by using the aligned second sensor image and the aligned obstruction-free second image may include determining, by a second DNN, visible pixels in the obstruction-free second image and the second sensor image corresponding to the occluded portions of the obstruction-free first image and of the first sensor image, wherein the occluded portion in the obstruction-free first image and the first sensor image may be identified using the first obstruction template, copying, by the second DNN, by a deep transfer technique the content from the visible pixels in the aligned obstruction-free second image and the second sensor image to the corresponding occluded portions of the obstruction-free first image and the first sensor image, and obtaining, by the second DNN, the reconstructed obstruction-free first image based on the deep transferred content in the obstruction-free first image, thereby providing an alternative to the known single image inpainting techniques which replace occluded regions with contextually generated pixels, and not with the true scene background information occluded by the obstruction which can only be recovered by using additional closely situated sensors.

In accordance with another aspect of the disclosure, an electronic device for obtaining a reconstructed image is provided. The electronic device may include a plurality of image sensors and an image reconstruction controller comprising a first DNN and a second DNN. The plurality of image sensors may be configured to capture a first sensor image of a scene by a first image sensor and a second sensor image of the scene by a second image sensor, the first sensor image and the second sensor image comprising at least one portion of the scene and at least one portion of an obstruction in the scene. The image reconstruction controller may be configured to generate an obstruction-free first image and a first obstruction template using the first sensor image and generate an obstruction-free second image and a second obstruction template using the second sensor image. Further, the image reconstruction controller is configured to determine a parallax shift between the obstruction-free first image and the obstruction-free second image, align the obstruction-free second image with respect to the obstruction-free first image using the determined parallax shift and align the second sensor image with respect to the first sensor image using the determined parallax shift. The image reconstruction controller is also configured to determine occluded portions in the first sensor image at corresponding locations in the aligned second sensor image and the obstruction-free first image at corresponding locations in the aligned obstruction-free second image, and obtain a reconstructed obstruction-free first image by reconstructing the occluded portions in the first sensor image and the obstruction-free first image by using the aligned second sensor image and the aligned obstruction-free second image.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the accompanying drawings, in which.

Throughout the drawings, it should be noted that like reference numbers are used to depict the same or similar elements, features, and structures.

MODE FOR INVENTION

Figure 1:
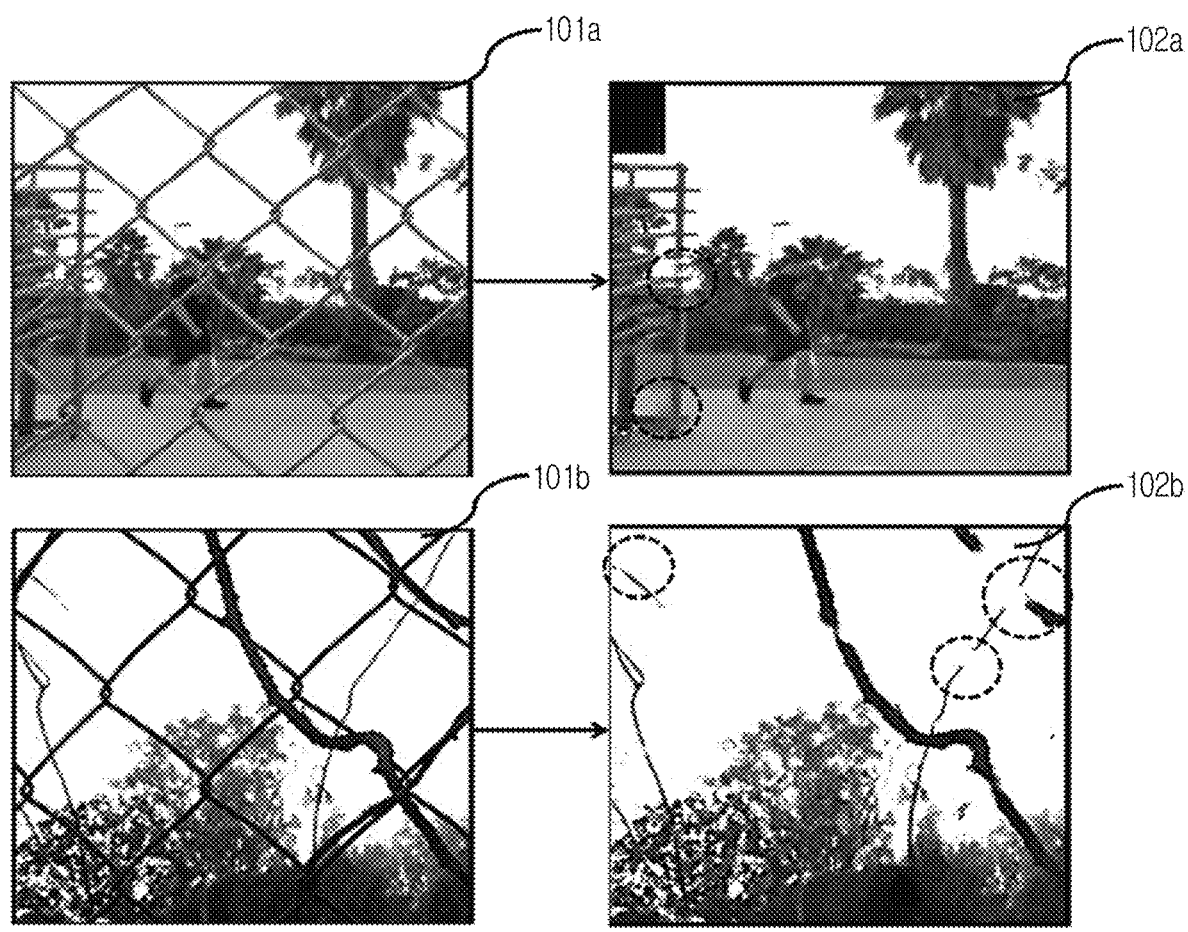
FIG. 1 illustrates examples of obstruction removal in an image using a single input image, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein are to provide a method for obtaining a reconstructed image in an electronic device. The method includes capturing, by the electronic device, a first sensor image of a scene by a first image sensor and a second sensor image of the scene by a second image sensor. The first sensor image and the second sensor image comprise at least one portion of the scene and at least one portion of an obstruction in the scene. Further, the method includes generating, by the electronic device, an obstruction-free first image and a first obstruction template using the first sensor image and independently generating, by the electronic device, an obstruction-free second image and a second obstruction template using the second sensor image. The method also includes determining, by the electronic device, a parallax shift between the obstruction-free first image and the obstruction-free second image and aligning, by the electronic device, the obstruction-free second image with respect to the obstruction-free first image using the determined parallax shift and aligning, by the electronic device, the second sensor image with respect to the first sensor image using the determined parallax shift. While the process of computing the parallax shift and alignment is known and is easy to understand in the case of the sensors being identical in every respect but separated by a certain distance, say 8 mm, the process can also be carried out for non-identical sensors such as wide-angle, telephoto, ultra-wide, and infrared and such sensors, where known alignment methods like Fourier-Mellin will suffice, as long as the sensor images are free of obstructions such as an intervening wire-fence which will hinder the automatic alignment process, which is the very reason the first key and novel portion of this disclosure comprises of independently removing the obstruction reasonably from the first and other sensor images using a first deep neural network DNN) just before the intermediate process of alignment. Furthermore, the method includes determining, by the electronic device, occluded portions in the first sensor image at corresponding locations in the aligned second sensor image and the occluded portion in the obstruction-free first image at corresponding locations in the aligned obstruction-free second image; and obtaining, by the electronic device, a reconstructed obstruction-free first image by reconstructing the occluded portions in the first sensor image and the obstruction-free first image by using the aligned second sensor image and the aligned obstruction-free second image, this reconstruction effected by a deep transfer stage involving a second DNN, which stage can be repeated to further improve the obstruction free output, depending on applying a quality metric or a user input to that effect. While the methods outlined herein are easy to illustrate and explain in the case of a wire-fence obstruction, nothing in these methods depends on the type or nature or periodicity of the obstruction or any additional step or method or device to detect or align the obstruction from the multiple sensor images, and therefore the disclosure applies equally well to other types of obstructions such as reflection.

Accordingly, embodiments herein provide the electronic device for obtaining the reconstructed image. The electronic device includes a memory, a processor, a communicator, a plurality of image sensors, and an image reconstruction controller comprising a first DNN and a second DNN with an intermediate alignment stage in between. The plurality of image sensors are configured to capture a first sensor image of a scene by a first image sensor and a second sensor image of the scene by a second image sensor. The first sensor image and the second sensor image comprise at least one portion of the scene and at least one portion of the obstruction in the scene. The image reconstruction controller is configured to generate an obstruction-free first image and a first obstruction template using the first sensor image and generate an obstruction-free second image and a second obstruction template using the second sensor image. Further, the image reconstruction controller is configured to determine a parallax shift between the obstruction-free first image and the obstruction-free second image, align the obstruction-free second image with respect to the obstruction-free first image using the determined parallax shift and align the second sensor image with respect to the first sensor image using the determined parallax shift. The image reconstruction controller is also configured to determine occluded portions in the first sensor image at corresponding locations in the aligned second sensor image and the same portions in the obstruction-free first image at corresponding locations in the aligned obstruction-free second image, using the obstruction template as a positional guidance to locate the occluded pixels; and obtain a reconstructed obstruction-free first image by reconstructing the occluded portions in the first sensor image and the obstruction-free first image by using the aligned second sensor image and the aligned obstruction-free second image.

In the methods and systems of the related art, the image is subjected to a single phase of obstruction/fence removal which may not be perfect. Therefore, there are possibilities that small portions of the obstruction/fence is left out in the image which reduces a quality of the output images from the first DNN in the first stage. Unlike methods and systems of the related art, the proposed method includes an additional second stage where the obstruction is removed using a deep transfer and which enhances the efficiency of the removal of the obstruction and increases the quality of the image.

In the methods and systems of the related art, when the obstruction is removed from the image, portions of the object of interest which are hidden or occluded behind the obstruction and sometimes even visible portions may also lose certain pixels. This leads to loss of information associated with the object of interest. Unlike methods and systems of the related art, the proposed method provides an artificial intelligence (AI) based image occlusion in-painting in a second stage which is required to detect and remove any remaining obstructions and also to intelligently copy or deep-transfer content from the aligned images to fill in the pixels which may have been lost in the first sensor image due to the removal of the obstruction. Further, unlike methods and systems of the related art, the proposed method intelligently-copies or deep-transfers from the true visible pixels in both the aligned second sensor image as well as the aligned obstruction-removed second image guidance in the second stage, where the additional Guidance Inputs feed into the second DNN include the occlusion-position Guidance Input namely the obstruction template, and the additional two Guidance Inputs namely the obstruction-removed first output image and the aligned obstruction-removed second output image. This disclosure also includes the inputting of the parallax-aligned second sensor image as an Image Input into the second DNN (along with the first sensor image) which provides almost all of the visible and true background pixels for the occluded pixels in the first sensor image.

In the methods and systems of the related art, a single image is captured and used for obstruction detection and removal which may not be a very accurate technique. Unlike methods and systems of the related art, the proposed method uses multiple image captures using the array of cameras of the electronic device of different focal lengths or field of views. Further, the method of aligning the images captured using multiple cameras, perhaps of different focal lengths or field of views, ensures exploiting, for the crucial deep-transfer, the key fact that the pixel which may be hidden by the obstruction in one image is visible in the other image, thereby making the reconstruction of the true background image possible and accurate. Further, the use of DNN models reduces power consumption and time and other complexity of the system.

In order to understand the fact that a background pixel hidden by a hard obstruction such as a wire-fence in one image is visible in the other image the following condition needs to be satisfied the background alignment parallax shift should be sufficiently larger than an x-thickness of a wire in the fence. This can be shown using epipolar geometry: say the x-distance between the first image sensor and the second image sensor is 8 mm, and the wire is 2 mm thick in the x axis (a ratio of 4); if the fence is at a distance of 80 cm from the sensors, then all background locations beyond X cm from the sensors where X satisfies $(X/(X-80)<=4)$ will be visible in at least one of the two sensors; the solution is $X>=107$ cm meaning that every background location beyond 1.1 m from the sensor will be visible in at least one camera, and therefore can be reconstructed by the proposed method. Only a few (not all) background locations closer than 30 cm on the other side of and hidden by the fence (1.1 m-0.8 m) will not be visible in any sensor, but the deep learning models in the first DNN and the second DNN have already been trained to reconstruct, which is the reason why the first DNN does an almost perfect job of removing and inpainting the fence obstruction in both sensor images independently making the intermediate alignment stage possible.

Unlike hard obstructions like wire-fence, in the case of soft obstructions like reflections appearing when imaging a desired background scene (such as natural scenery or a city-scape or an aquarium or a glass-framed painting in a museum) through transparent glass, the condition to-be-satisfied instead becomes that the parallax shift of the desired background scene should be substantially different from the parallax shift of the reflection in the two sensor images, so that the obstruction template produced by the first DNN can positionally guide the second DNN in where to effect the deep transfer.

In case it is needed that a reasonable fence-obstruction-removed image should be much more rapidly produced (as in the case of a camera preview or a video preview) from a multi-sensor image acquisition, one can avoid the second DNN (which is meant to perform a faithful deep transfer from second sensor image to the first) and instead simply copy the visible pixels from the aligned second sensor image to the occluded pixels in the first sensor image at the (x,y) locations indicated by the obstruction template which has been produced by the first stage DNN, and then harmonize the extremely thin boundaries of the copied region by smoothing them. This also has the advantage that if the user, through an interface, indicates that the resulting preview image is not up to expectation, then in real time, slightly different parallax shifts can be tried during the simple copy process until the preview image becomes acceptable to the user, or satisfies a certain metric of sharpness when a portion of the visible (not occluded) region is copied over from the second image to the first image to perform the test of sharpness of the overlay.

Referring now to the drawings and more particularly to FIGS. 2 to 6, 7A, and 7B, where similar reference characters denote corresponding features consistently throughout the figures, there are shown preferred embodiments.

Figure 2:
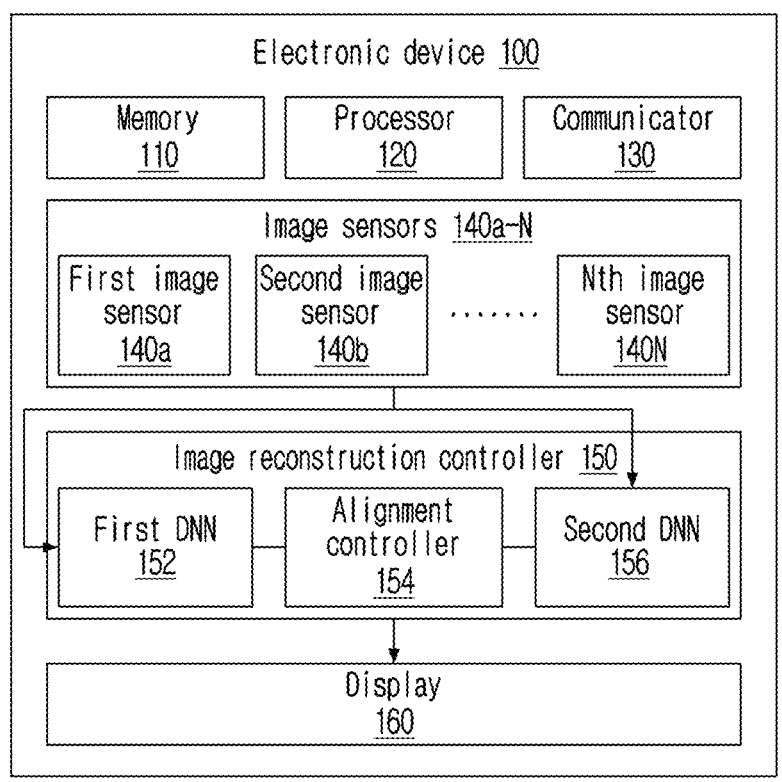
FIG. 2 illustrates a block diagram of an electronic device for obtaining a reconstructed image by removing the obstruction in the image using inputs from multiple imaging sensors, according to an embodiment of the disclosure.

FIG. 2 illustrates a block diagram of an electronic device (100) for obtaining a reconstructed image by removing an obstruction in an image using inputs from multiple image sensors, according to an embodiment of the disclosure. The electronic device (100) can be, but not limited to a laptop, a palmtop, a desktop, a mobile phone, a smart phone, Personal Digital Assistant (PDA), a tablet, a wearable device, an Internet of Things (IoT) device, a virtual reality device, a foldable device, a flexible device and an immersive system.

In an embodiment, the electronic device (100) includes a memory (110), a processor (120), a communicator (130), multiple image sensors (140a-N), an image reconstruction controller (150) and a display (160).

The memory (110) is configured to store a first sensor image, a second sensor image and corresponding an obstruction-free first image, an obstruction-second first image, a first obstruction template, a second obstruction template or a metadata associated with the above parameters. Further, the memory (110) also stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information. In certain examples, a non-transitory storage medium may store data that can, over time, change (e.g., in random access memory (RAM) or cache).

The processor (120) communicates with the memory (110), the communicator (130), the multiple image sensors (140a-N), the image reconstruction controller (150), and the display (160). The processor (120) is configured to execute instructions stored in the memory (110) and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an artificial intelligence (AI) dedicated processor such as a neural processing unit (NPU).

The communicator (130) includes an electronic circuit specific to a standard that enables wired or wireless communication. The communicator (130) is configured to communicate internally between internal hardware components of the electronic device (100) and with external devices via one or more networks.

The multiple image sensors (140a-N) include at least two image sensors, e.g., a first image sensor (140a), a second image sensor (140b), and an Nth image sensor (140N) with corresponding lenses used to capture a scene. During operation, a lens focuses light onto the first image sensor (140a) or second image sensor (140b). Pixels in the first image sensor (140a) or second image sensor (140b) include photosensitive elements that convert the light into digital data and capture the image frame of the scene. A typical image sensor may, for example, have millions of pixels (e.g., megapixels) and is configured to capture a series of image frames of the scene based on a single click input from a user. The first image sensor (140a) is located on a left side and the second image sensor (140b) is located to a right side of a located on an imaginary axis of a camera unit of the electronic device (100) with a small distance (typically 8 mm in a smart phone) separating the first image sensor (140a) and the second image sensor (140b). Each of the multiple image sensors (140a-N) may comprise different field of views such as for example but not limited to a wide-angle image sensor, telephoto image sensors, ultra-wide image sensors, etc. In an example, the first image sensor (140a) and the second image sensor (140b) may be considered to be of dissimilar type i.e., for example the first image sensor (140a) is the wide-angle image sensor and the second image sensor (140b) is the telephoto image sensor. The first sensor image is captured by the first image sensor (140a) and the second sensor image is captured by the second image sensor (140b) of the scene along with an obstruction in the scene. The first sensor image and the second sensor image may be for example still images capturing the scene, video comprising multiple images, or a combination thereof. The obstruction in the scene can be for example but not limited to a wire-fence, reflection, shadow, any other form of artefact which blocks or masks a subject of interest in the scene. For example, consider the first sensor image comprises a zebra behind fence-wires in a zoo captured by a wide-angle image sensor (i.e. first image sensor (140a)). The second sensor image also comprises the same zebra behind the fence-wires of the zoo but captured by a telephoto image sensor (i.e. second image sensor (140b)). Here, the zebra is the subject of interest but the zebra is located behind the fences and hence the fence obstructs a complete capture of the zebra. Since the first image sensor (140a) and the second image sensor (140b) have different field of view, the first sensor image and the second sensor image capture the same zebra differently behind the fence i.e., a certain portion of some stripes on the zebra which are partly hidden/masked due to the presence of the fence in the first sensor image may be visible in the second sensor image and vice versa.

In an embodiment, the image reconstruction controller (150) may be implemented by processing circuitry such as logic gates, integrated circuits, microprocessors, microcontrollers, memory circuits, passive electronic components, active electronic components, optical components, hard-wired circuits, or the like, and may optionally be driven by firmware. The circuits may, for example, be embodied in one or more semiconductors. The image reconstruction controller (150) may be implemented by processor (120). The image reconstruction controller (150) comprises a first DNN (152), an alignment controller (154), and a second DNN (156). In an embodiment, the first DNN (152) is configured to identify the obstruction in the first sensor image and generate the reasonably obstruction-free first image and a first obstruction template by removing the obstruction in the first sensor image. The first DNN (152) is also configured to independently identify the obstruction in the second sensor image and generate the reasonably obstruction-free second image and a second obstruction template by removing the obstruction as seen from the second sensor image. The first DNN (152) is trained using multiple images of the various types of obstructions to be able to identify the obstruction when an image is passed through the first DNN (152). The first DNN (152) is also trained to remove the identified obstruction.

In an embodiment, the alignment controller (154) is configured to determine a parallax shift between the obstruction-free first image and the obstruction-free second image. Further, the alignment controller (154) is configured to align the obstruction-free second image with respect to the obstruction-free first image using the parallax shift and to align the second sensor image with respect to the first sensor image using the same parallax shift. The aligned second sensor image comprises pixels aligned in the correct position with pixels in the first sensor image. The pixels aligned in the aligned second sensor image and the pixels in the first sensor image correspond to visible information in the scene or an occluded pixel in the first sensor image with corresponding pixel visible in the aligned second sensor image. The aligned obstruction-free second image includes pixels aligned in position with pixels in the obstruction-free first image. The pixels aligned in the aligned obstruction-free second image and the pixels in the obstruction-free first image correspond to one of visible information in the scene and an occluded pixel in the obstruction-free first image with corresponding pixel visible in the aligned obstruction-free second image. Further, the alignment controller (154) provides an aligned obstruction-free second image and an aligned second sensor image as outputs.

In an embodiment, the second DNN (156) is configured to receive the aligned obstruction-free second image, the aligned second sensor image, and the first obstruction template as guidance inputs. The second DNN (156) receives the first sensor image and the first obstruction-free image also as inputs. Further, the second DNN (156) is configured to determine the occluded portions in the first sensor image at corresponding locations in the aligned second sensor image and to determine the occluded portions in the obstruction-free first image at corresponding locations in the aligned obstruction-free second image. Further, the second DNN (156) is also configured to determine the visible pixels in the obstruction-free second image and the second sensor image corresponding to the occluded portions of the obstruction-free first image which is identified using the first obstruction template and copy by a deep transfer technique content from the visible pixels in the aligned obstruction-free second image and the second sensor image to the corresponding occluded portions of the obstruction-free first image to obtain the reconstructed obstruction-free first image. The second DNN (156) may be trained using a very large number of training images to be able to learn to determine the occluded portions between two images using the guidance images and also learn to apply a deep transfer technique to copy the content from the image where the pixel is visible to the other image where the corresponding pixel is occluded/hidden/masked by an object or the obstruction.

At least one of the plurality of modules/components of the image reconstruction controller (150) may be implemented through an AI model. A function associated with the AI model may be performed through memory (110) and the processor (120). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), DNN, recurrent neural network (RNN), restricted Boltzmann Machine (RBM), deep belief network (DBN), bidirectional recurrent DNN (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

The display (160) is configured to display the restructured image after the removal of the obstruction in the first sensor image and the second sensor image on a screen of the electronic device (100). The display (160) is capable of receiving inputs and is made of one of liquid crystal display (LCD), light emitting diode (LED), organic light-emitting diode (OLED), etc. The display can also provide a user interface for the user to provide real time input response or feedback to control the process, as mentioned before.

Although the FIG. 2 shows various hardware components of the electronic device (100) but it is to be understood that other embodiments are not limited thereon. In other embodiments, the electronic device (100) may include a lessor or greater number of components. Further, the labels or names of the components are used only for illustrative purpose and does not limit the scope of the disclosure. One or more components can be combined together to perform the same or a substantially similar function to reconstruct the image by removing the obstruction in the image.

Figure 3:
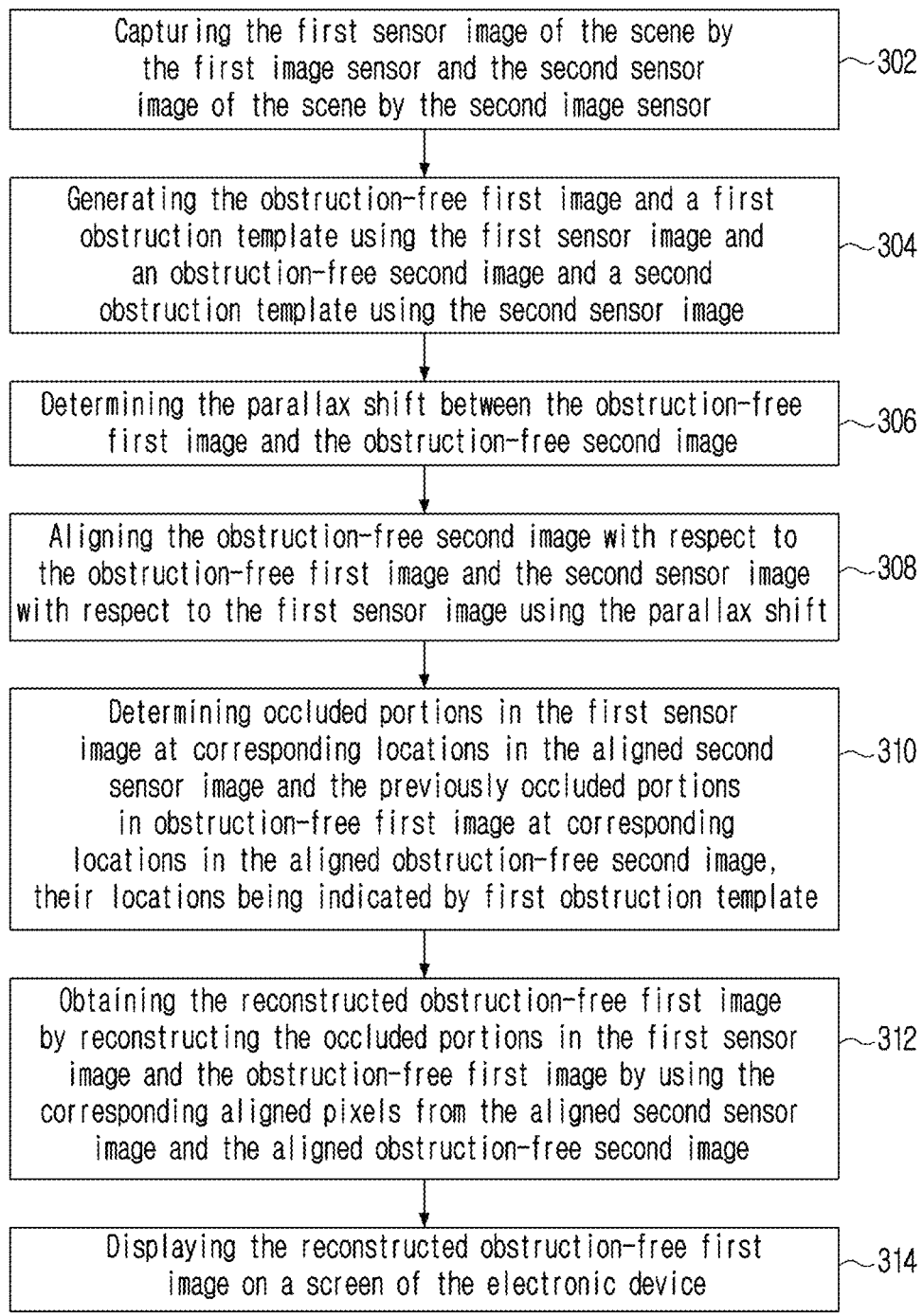
FIG. 3 is a flow diagram illustrating a method for obtaining the reconstructed image by removing the obstruction in the image, according to an embodiment of the disclosure.

FIG. 3 is a flow diagram (300) illustrating a method for reconstructing the image by removing the obstruction in the image using the inputs from the multiple imaging sensors (150*a*-N), according to an embodiment of the disclosure.

Referring to FIG. 3, at operation 302, the method includes the electronic device (100) capturing the first sensor image and the second sensor image of the scene. For example, in the electronic device (100) as illustrated in the FIG. 2, the first image sensor (140*a*) is configured to capture the first sensor image, and the second image sensor (140*b*) is configured to capture the second sensor image.

At operation 304, the method includes the electronic device (100) generating the obstruction-free first image and the first obstruction template using the first sensor image and the obstruction-free second image, and the second obstruction template using the second sensor image. For example, in the electronic device (100) as illustrated in the FIG. 2, the image reconstruction controller (150) is configured to generate the obstruction-free first image and the first obstruction template using the first sensor image and the obstruction-free second image and the second obstruction template using the second sensor image.

At operation 306, the method includes the electronic device (100) determining the parallax shift between the obstruction-free first image and the obstruction-free second image. For example, in the electronic device (100) as illustrated in the FIG. 2, the image reconstruction controller (150) is configured to determine the parallax shift between the obstruction-free first image and the obstruction-free second image.

At operation 308, the method includes the electronic device (100) aligning the obstruction-free second image with respect to the obstruction-free first image and the second sensor image with respect to the first sensor image using the parallax shift. For example, in the electronic device (100) as illustrated in the FIG. 2, the image reconstruction controller (150) is configured to align the obstruction-free second image with respect to the obstruction-free first image and the second sensor image with respect to the first sensor image using the parallax shift.

At operation 310, the method includes the electronic device (100) determining occluded portions in the first sensor image at corresponding locations in the aligned second sensor image and the obstruction-free first image at corresponding locations in the aligned obstruction-free second image. For example, in the electronic device (100) as illustrated in the FIG. 2, the image reconstruction controller (150) is configured to determine occluded portions in the first sensor image at corresponding locations in the aligned second sensor image and the obstruction-free first image at corresponding locations in the aligned obstruction-free second image.

At operation 312, the method includes the electronic device (100) obtaining the reconstructed obstruction-free first image by reconstructing the occluded portions in the first sensor image and the obstruction-free first image by using the aligned second sensor image and the aligned obstruction-free second image. For example, in the electronic device (100) as illustrated in the FIG. 2, the image reconstruction controller (150) is configured to obtain the reconstructed obstruction-free first image by reconstructing the occluded portions in the first sensor image and the obstruction-free first image by using the aligned second sensor image and the aligned obstruction-free second image.

At operation 314, the method includes the electronic device (100) displaying the reconstructed obstruction-free first image. For example, in the electronic device (100) as illustrated in the FIG. 2, the display (160) is configured to displaying the reconstructed obstruction-free first image.

The various actions, acts, blocks, steps, or the like in the flow diagram (300) may be performed in the order presented, in a different order or simultaneously. Further, in some embodiments, some of the actions, acts, blocks, steps, or the like may be omitted, added, modified, skipped, or the like without departing from the scope of the disclosure.

Figure 4:
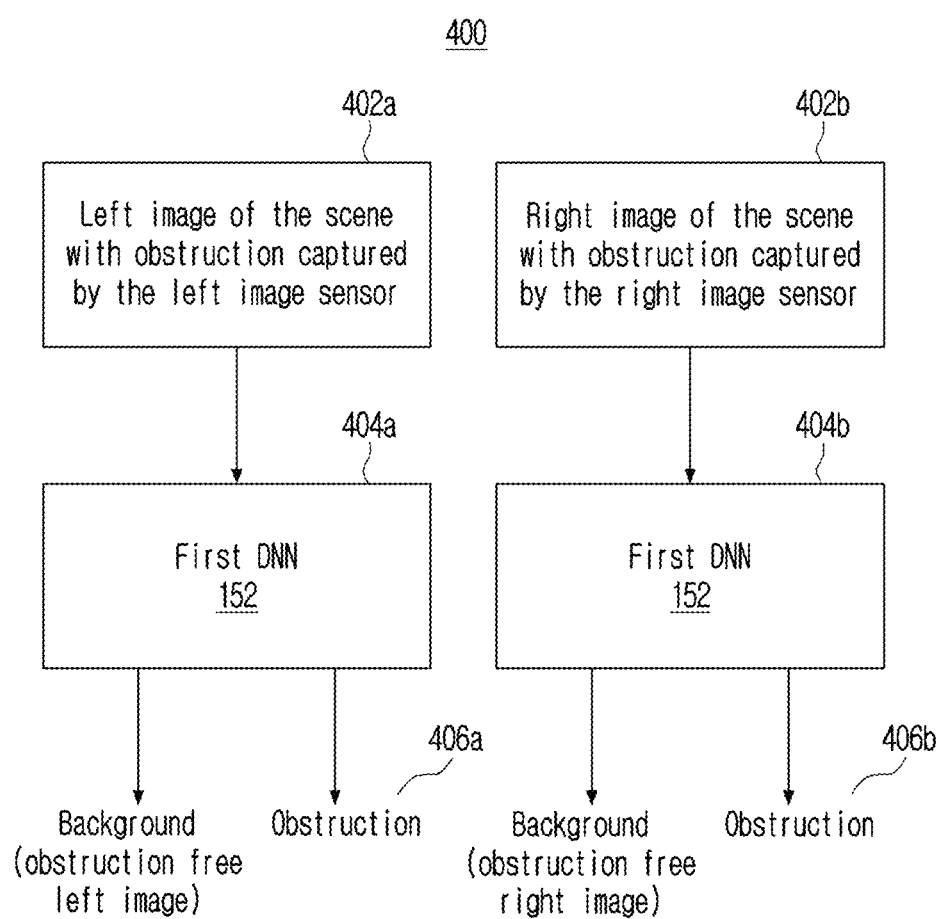
FIG. 4 is a flow diagram illustrating various operations performed by a first deep neural network (DNN) in an image reconstruction controller of the electronic device, according to an embodiment of the disclosure.

FIG. 4 is a flow diagram (400) illustrating various operations performed by the first DNN (152) in the image reconstruction controller (150) of the electronic device (100), according to an embodiment of the disclosure.

Consider at operation 402a the first DNN (152) receives the left sensor image of the scene with the obstruction captured by the left image sensor (e.g., first image sensor 140a) and at operation 402b the first DNN (152) receives the right sensor image of the scene captured by the right image sensor (e.g., second image sensor 140b) with the obstruction, as inputs. Throughout this disclosure the terms first, second, left and right are used interchangeably and means the same. The terms obstruction and fence may be used interchangeably throughout the specification document. However, the proposed method is applicable to reconstruct images comprising multiple forms of obstructions and is not restricted to fences alone.

At operation 404a and operation 404b, the first DNN (152) intelligently identifies the obstruction in the left sensor image and the right sensor image independently. Further, the first DNN (152) removes most of the obstruction and retains only the object of interest in the scene in both the left sensor image and the right sensor image. Further, the first DNN (152) also in-paints the obstruction areas in each of the left sensor image and the right sensor image. The first DNN (152) is trained with a large number of images which includes multiple objects of interest and the obstructions such as the fences, which enables the first DNN (152) to identify the obstruction post the training phase. However, there are possibilities of minute pixels of the obstruction still being present in the obstruction-free first image and the obstruction-free second image even after being passed through the trained first DNN (152) which necessitates further processing of the images.

At operation 406a, the first DNN (152) generates outputs which include the left background image output (LO), an accurate left fence template (LF) as seen from the left image sensor (e.g., first image sensor 140a) and at operation 406b the first DNN (152) generates right background image output (RO) and an accurate right fence template (RF) as seen from the right image sensor (e.g., second image sensor 140b). Here, the term background refers to the object of interest which is behind the obstruction/fence, which appears in the foreground obstructing the clear view of the object of interest.

The first DNN (152) is a single image obstruction removal model. The first DNN (152) is trained using 3,00,000 genuine images obtained from single image sensor where each of the genuine images comprises the obstruction such as the fence to produce (a) an obstruction-free background image output and (b) fence template image output. Though, the first DNN (152) removes most of the obstruction portions of any input image, minute portions of the obstruction may be left in the obstruction-free background image output.

The advantage of using the first DNN (152) is that the LO, the RO, the left sensor image, and the right sensor image can be aligned (which may not be possible when the obstruction is present) to subsequently guide the more accurate occlusion removal and image reconstruction which will be performed by the second DNN (156).

Figure 5:
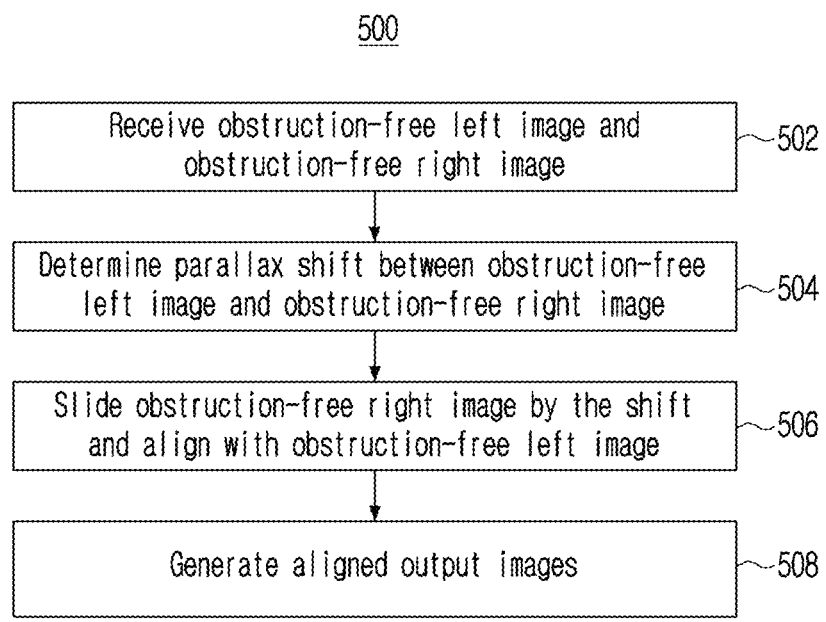
FIG. 5 is a flow diagram illustrating various operations performed by an alignment controller in the image reconstruction controller of the electronic device, according to an embodiment as disclosed herein.

FIG. 5 is a flow diagram (500) illustrating various operations performed by the alignment controller (154) in the image reconstruction controller (150) of the electronic device (100), according to an embodiment of the disclosure.

Referring to FIG. 5, at operation 502, the alignment controller (154) receives the obstruction-free left image and the obstruction-free right image. At operation 504, the alignment controller (154) determines the parallax shift between the obstruction-free left image and the obstruction-free right image based on selection of Global or Local option, e.g. Tiger (object of interest in the image). The precise parallax shift S from the obstruction-free right image to the obstruction-free left image can be computed using a known technique such as for example but not limited to Fourier Phase Correlation.

At operation 506, the alignment controller (154) slides the obstruction-free right image by the shift (S) and aligns the obstruction-free right image with the obstruction-free left image. Further, the alignment controller (154) also aligns the right sensor image with respect to the left sensor image which will both be provided as inputs to the second DNN (156) aligned by the shift S, which is critical to the deep transfer to be affected by the second DNN.

At operation 508, the alignment controller (154) provides all the output aligned images which will be fed to the second DNN (156) as inputs. The outputs of the alignment controller (154) include the obstruction-free left image, the aligned obstruction-free right image, the left image, and the aligned right image. The obstruction-free left image, the aligned obstruction-free right image along with the LF is considered to be the guidance images for the second DNN (156).

The alignment controller (154) is an intermediate module and is not description logic (DL)-based as an unknown parallax shift S needs to be estimated. When the two backgrounds are shift-aligned, the two obstruction templates are not aligned because the parallax shift in the two obstruction templates is much larger when compared to the shift in the backgrounds. Therefore, every pixel (x, y) which is occluded in the left image is visible at the same (x, y) in the right aligned image and vice versa.

Further, the operations 502 to 508 are also repeated on the left sensor image and the right sensor image to obtain the aligned outputs.

Figure 6:
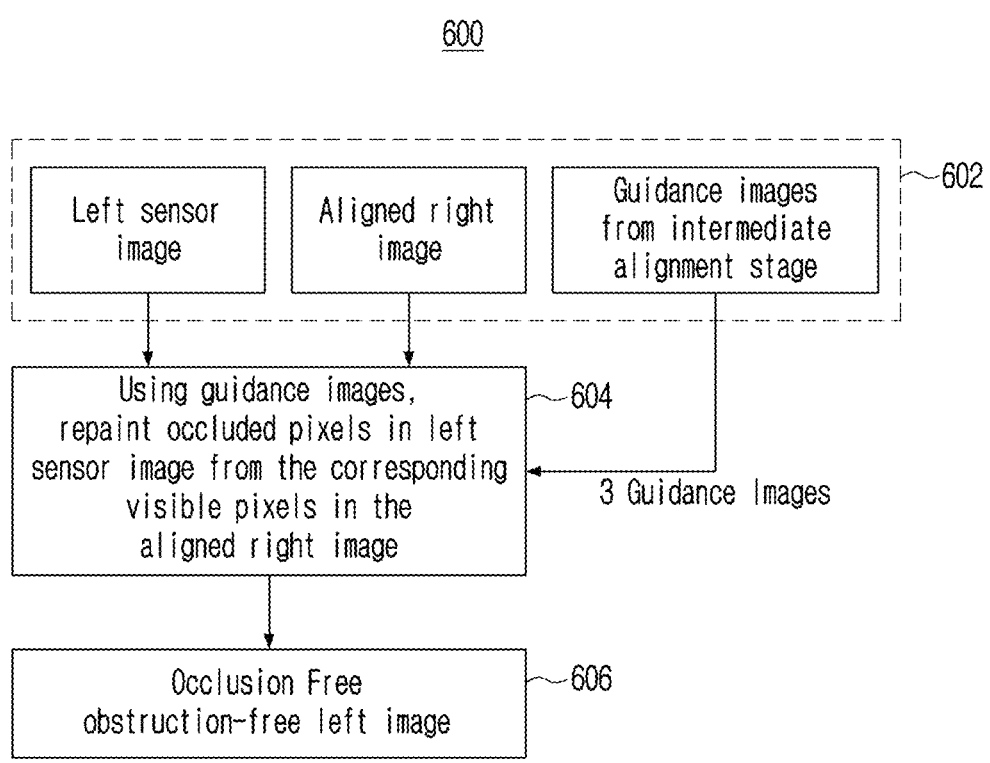
FIG. 6 is a flow diagram illustrating various operations performed by a second DNN in an image reconstruction controller of the electronic device, according to an embodiment of the disclosure.

FIG. 6 is a flow diagram (600) illustrating various operations performed by the second DNN (156) in the image reconstruction controller (150) of the electronic device (100), according to an embodiment of the disclosure.

Referring to FIG. 6, at operation 602, the second DNN (156) receives the inputs which include the left sensor image, the aligned right sensor image and the guidance images from the intermediate alignment controller (154).

At operation 604, the second DNN (156) uses the guidance images to intelligently repaint the occluded pixels in the left sensor image from the corresponding visible pixels in the aligned right sensor image and at operation 606 the second DNN (156) generates the occlusion free obstruction-free left sensor image which is then displayed on the screen of the electronic device (100). The information visible at the pixel location (x, y) in the right aligned image is deep-transferred from the right (x, y) to left (x, y) because the background parallax shift has already been applied.

Therefore, unlike to the methods and system of the related art, the proposed method does not contextually predict or guess the occluded pixels without knowing their true values, but rather intelligently copies the pixels from the right aligned image into the occluded pixels of the left sensor image. Thereby increasing the accuracy and fidelity of the procedure involved in the reconstruction of the image.

Figure 7A:
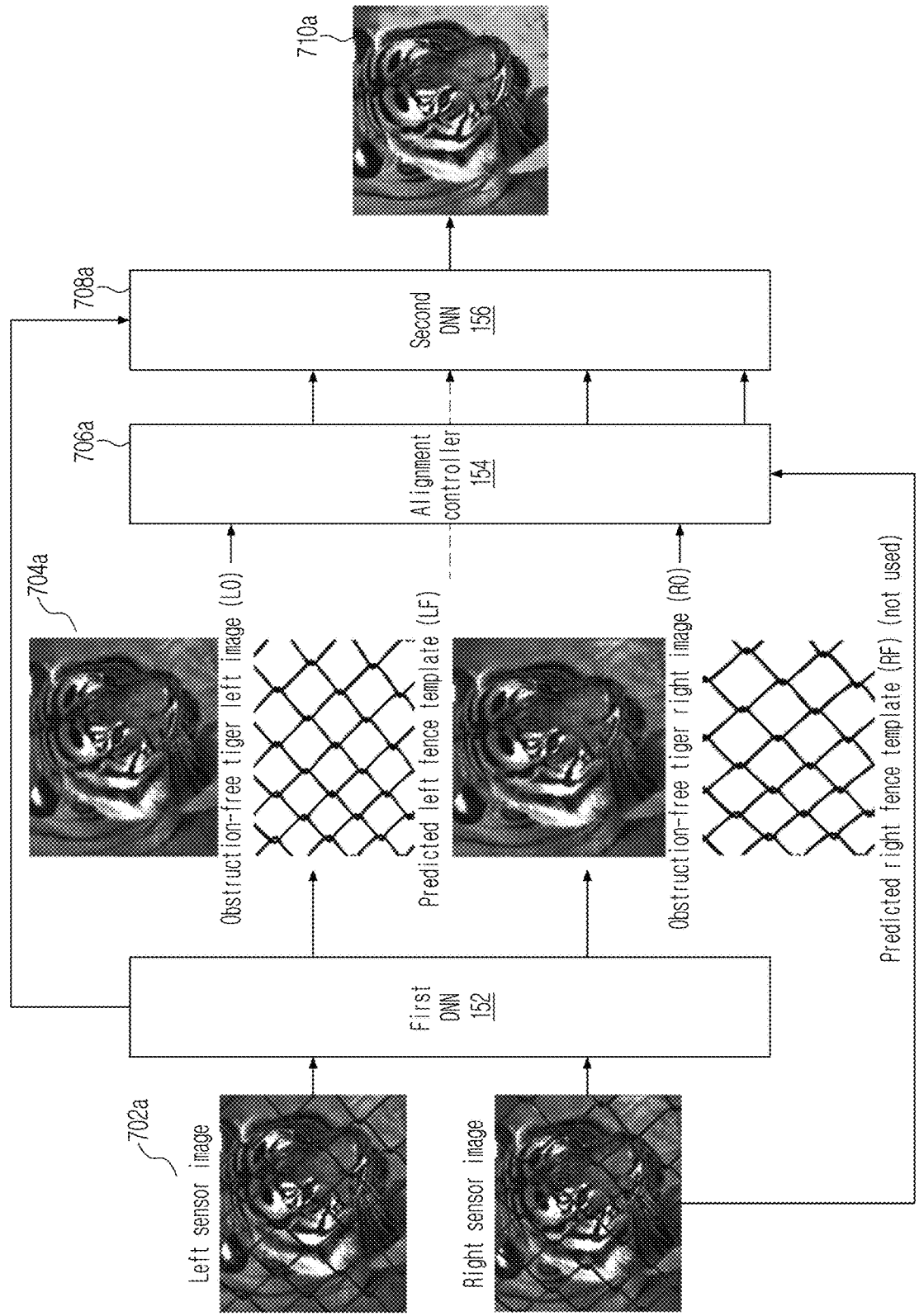
FIGS. 7A and 7B are example scenarios illustrating the reconstruction of the image by removing the obstruction in the image using inputs from the multiple imaging sensors of the electronic device, according to various embodiments of the disclosure.
Figure 7B:
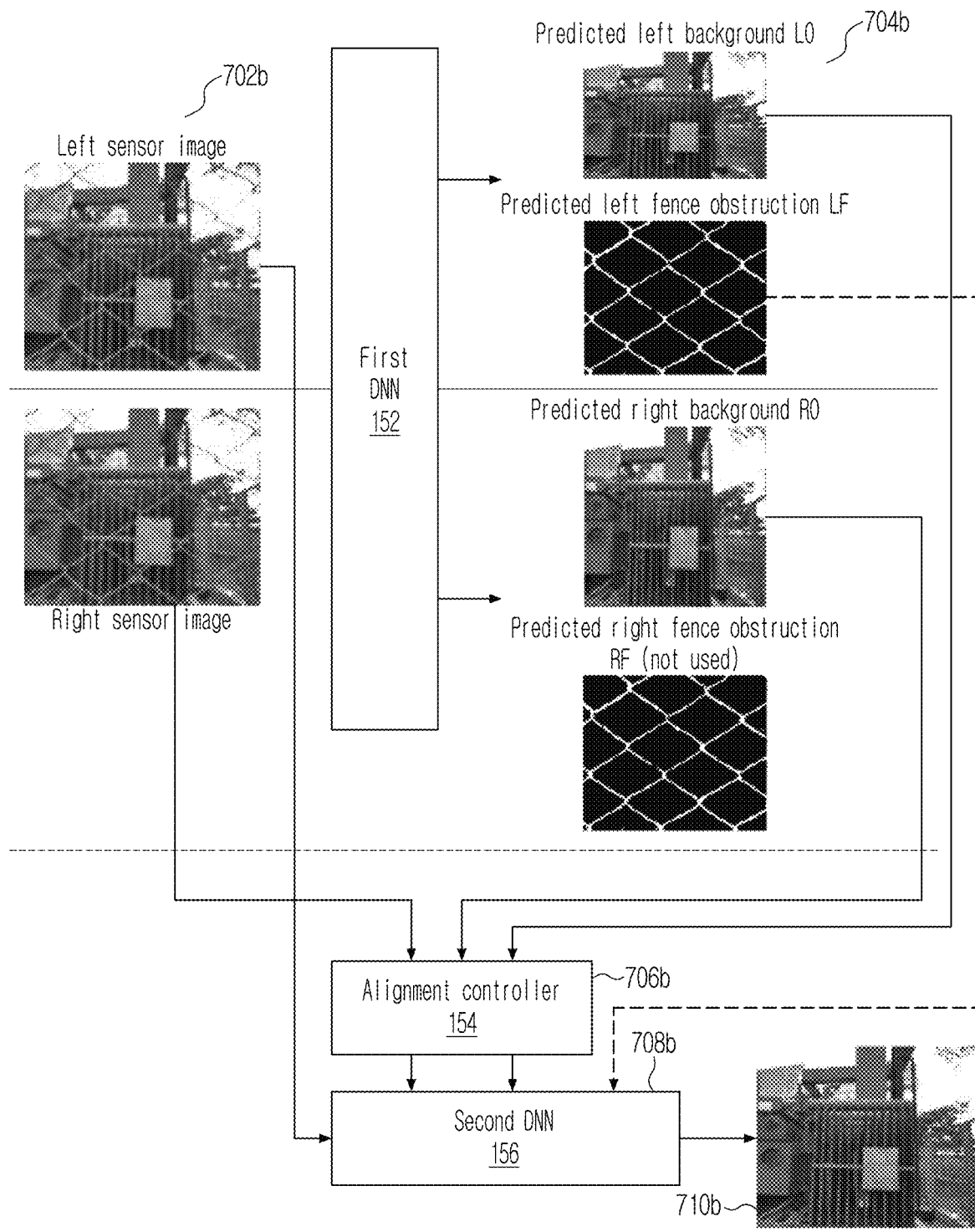

FIGS. 7A and 7B are example scenarios illustrating the reconstruction of the image by removing the obstruction in the image using inputs from the multiple imaging sensors (140a-N) of the electronic device (100), according to various embodiments of the disclosure.

Referring to FIG. 7A, consider the electronic device (100) captures the left sensor image and the right sensor image of a tiger behind the fence at a zoo. The fences block the clear view of the image of the tiger and hence the fence needs to be removed. At operation 702a, the electronic device (100) intelligently passes the left sensor image of the tiger and the right sensor image of the tiger through the first DNN (152) to remove the fence which is blocking the clear view of the tiger in the image.

At operation 704a, the first DNN (152) generates the following outputs obstruction-free tiger left image (LO), predicted left fence template (LF), obstruction-free tiger right image (RO), and the predicted right fence template (RF). The RF may not be used in further processing. At operation 706a, the alignment controller (154) receives the LO, the LF, and the RO from the first DNN (152) and the right sensor image as inputs. The alignment controller (154) determines the parallax shift between the left sensor image and the right sensor image. Further, the alignment controller (154) aligns the right sensor image with respect to the left sensor image and aligns the RO with respect to the LO using the determined parallax shift. Due to the alignment, the pixel-by-pixel analysis becomes easier as the content such as a particular stripe of the tiger will be presented in the exact same location in the left sensor image and the right sensor image, similarly in the LO and the RO.

At operation 708a, the second DNN (156) receives the aligned LO, the aligned RO, and the LF as guidance images, as also the aligned right sensor image and the left sensor image of the tiger as normal inputs. The second DNN (156) effectively performs the pixel-by-pixel analysis to determine the pixels which are occluded or hidden in the left sensor image but visible in the right sensor image such as the specific stripes of the tiger, using the aligned LO, the aligned RO, the LF, the left sensor image and the aligned right sensor image. The guidance images enable the second DNN (156) to identify the pixels which actually illustrate the tiger in the left sensor image and also to determine the pixels associated with say specific stripes of the tiger which are occluded in the left sensor image but are visible in and obtained from the right sensor image as well as in the guidance images. Once the occluded pixels in the left sensor image are identified by the second DNN (156), then the content corresponding to the occluded pixels are intelligently repainted from the aligned right sensor image to the left sensor image using our novel deep transfer techniques to provide the obstruction free tiger image as shown in operation 710a.

The proposed method not only removes the fence which obstructs capturing a clear view of the tiger, but also ensures that bits and pieces of the fences, if any are left out after applying the first DNN (152) are removed and the final tiger image clearly reconstructed by repainting the hidden pixels. Therefore, the proposed method provides an enhanced quality image by completing the =reconstruction of the object of interest and removing the obstruction completely, thereby providing the user an enhanced experience as though the user has captured the image of the tiger in the wild and not in the zoo. Further, the electronic device (100) uses images captured by the multiple image sensors (140a-N) of different focal lengths or field of views to provide the reconstructed image, which makes the entire process cost-effective since an additional sensor identical to the first sensor doesn't have to be provided. Also, the use of trained DNNs reduces power requirements which would have otherwise been high to achieve such enhanced reconstruction of the image.

Referring to FIG. 7B in conjunction with the FIG. 7A, consider another scenario where an image of a transformer that is placed behind the fence is captured. The fences block the clear view of the transformer which may be monitored for defects, etc., and hence the fence needs to be removed in the captured image. At operation 702b, the electronic device (100) provides the left sensor image of the transformer and the right sensor image of the transformer through the first DNN (152) to remove the fence which is blocking the clear view of the transformer in the image.

At operation 704b, the first DNN (152) generates the following outputs obstruction-free transformer left image (LO), predicted left fence template (LF), obstruction-free transformer right image (RO), and the predicted right fence template (RF). The RF may not be used in further processing. At operation 706b, the alignment controller (154) receives the LO, the LF and the RF from the first DNN (152) and the right sensor image as inputs. The alignment controller (154) determines the parallax shift between the left sensor image and the right sensor image. Further, the alignment controller (154) aligns the right sensor image with respect to the left sensor image and aligns the RO with respect to the LO using the determined parallax shift.

At operation 708b, the second DNN (156) receives the aligned LO, the aligned RO, the LF, the aligned right sensor image, the left sensor image of the transformer. The second DNN (156) determines the pixels which are occluded or hidden in the left sensor image but visible in the right sensor image using the aligned LO, the aligned RO, the LF, the aligned right sensor image for guidance, and the content corresponding to the occluded pixels are intelligently copied from the aligned right sensor image to the left sensor image using the novel deep transfer technique to provide the obstruction free transformer image as shown in operation 710b.

Further, the proposed method can be used in security/surveillance applications to identify specific wanted individuals, objects, etc. who may be voluntarily using obstructions to seal identity. The identification would require only the electronic device (100) having multiple image sensors (140a-N) of different focal lengths and trained DNNs.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for obtaining a reconstructed image in an electronic device, the method comprising:
    capturing, by the electronic device, a first sensor image of a scene by a first image sensor and a second sensor image of the scene by a second image sensor, the first sensor image and the second sensor image comprising at least one portion of the scene and at least one portion of an obstruction in the scene;
    generating, by a first deep neural network (DNN) of the electronic device, an obstruction-free first image and a first intermediate image including the at least one portion of the obstruction using the first sensor image;
    generating, by the first DNN of the electronic device, an obstruction-free second image and a second intermediate image including the at least one portion of the obstruction using the second sensor image;
    determining, by the electronic device, an alignment offset between the obstruction-free first image and the obstruction-free second image based on an object of interest in the obstruction-free first image and the obstruction-free second image;
    aligning, by the electronic device, the obstruction-free second image with respect to the obstruction-free first image using the determined alignment offset;
    aligning, by the electronic device, the second sensor image with respect to the first sensor image using the determined alignment offset;
    determining, by a second deep neural network (DNN) of the electronic device, a first region, which is hidden by the obstruction, in the first sensor image at corresponding locations in the aligned second sensor image;
    determining, by the second DNN of the electronic device, a second region corresponding to the first region in the obstruction-free first image at corresponding locations in the aligned obstruction-free second image; and
    obtaining, by the second DNN of the electronic device, a reconstructed obstruction-free first image by reconstructing the first region in the first sensor image and the second region in the obstruction-free first image by using the aligned second sensor image and the aligned obstruction-free second image.

2. The method as claimed in claim 1, further comprising:
    displaying, by the electronic device, the reconstructed obstruction-free first image on a screen of the electronic device upon at least one of completion of the capturing of the first sensor image and the second sensor image of the scene or during a camera preview of the scene;
    receiving, by the electronic device, a user input to modify a portion of the reconstructed obstruction-free first image; and
    displaying, by the electronic device, a modified reconstructed obstruction-free first image on a screen of the electronic device.

3. The method as claimed in claim 1, wherein the generating, by the electronic device, of the obstruction-free first image and the first intermediate image using the first sensor image comprises:
    receiving, by the first DNN of the electronic device, the first sensor image; and
    generating, by the first DNN, the obstruction-free first image and the first intermediate image,
    wherein the generating, by the electronic device, of the obstruction-free second image and the second intermediate image using the second sensor image comprises:
        receiving, by the first DNN, of the electronic device, the second sensor image; and
        generating, by the first DNN, the obstruction-free second image and the second intermediate image.

4. The method as claimed in claim 1,
    wherein the aligned obstruction-free second image comprises pixels aligned in position with respective pixels in the obstruction-free first image, and
    wherein the pixels aligned in the aligned obstruction-free second image and the respective pixels in the obstruction-free first image correspond to one of visible information in the scene or a hidden pixel in the obstruction-free first image with corresponding pixel visible in the aligned obstruction-free second image.

5. The method as claimed in claim 1,
    wherein the aligned second sensor image comprises pixels aligned in position with respective pixels in the first sensor image, and
    wherein the pixels aligned in the aligned second sensor image and the pixels in the first sensor image correspond to one of visible information in the scene or a hidden pixel in the first sensor image with corresponding pixel visible in the aligned second sensor image.

6. The method as claimed in claim 3, wherein the determining, by the electronic device, of the first region in the first sensor image and the obstruction-free first image using the aligned second sensor image and the aligned obstruction-free second image respectively comprises:
    receiving, by the second DNN of the electronic device, the aligned first sensor image, the aligned second sensor image, the aligned first obstruction-free image, the aligned second obstruction-free image, and the first intermediate image as inputs; and
    determining, by the second DNN, the second region in the obstruction-free first image by referring to the aligned obstruction-free second image, and the first region in the first sensor image by referring to the aligned second sensor image, wherein the second region in the obstruction-free first image and the first region in the first sensor image are determined using the first intermediate image as guidance.

7. The method as claimed in claim 3, wherein the obtaining, by the electronic device, of the reconstructed obstruction-free first image by reconstructing the first region in the first sensor image and the obstruction-free first image by using the aligned second sensor image and the aligned obstruction-free second image comprises:
determining, by the second DNN, visible pixels in the obstruction-free second image and the second sensor image corresponding to the second region in the obstruction-free first image, wherein the second region in the obstruction-free first image is identified using the first intermediate image;
copying, by the second DNN, content from the visible pixels in the aligned obstruction-free second image and the second sensor image to the second region in the obstruction-free first image and the first sensor image; and
obtaining, by the second DNN, the reconstructed obstruction-free first image based on the copied content in the obstruction-free first image.

8. An electronic device for obtaining a reconstructed image, the electronic device comprising:
a plurality of image sensors configured to capture a first sensor image of a scene by a first image sensor and a second sensor image of the scene by a second image sensor, the first sensor image and the second sensor image comprising at least one portion of the scene and at least one portion of an obstruction in the scene; and
an image reconstruction controller comprising a first deep neural network (DNN) and a second DNN, and configured to:
generate an obstruction-free first image and a first intermediate image including the at least one portion of the obstruction using the first sensor image,
generate an obstruction-free second image and a second intermediate image including the at least one portion of the obstruction using the second sensor image,
determine an alignment offset between the obstruction-free first image and the obstruction-free second image,
align the obstruction-free second image with respect to the obstruction-free first image using the determined alignment offset,
align the second sensor image with respect to the first sensor image using the determined alignment offset,
determine a first region, which is hidden by the obstruction, in the first sensor image at corresponding locations in the aligned second sensor image and a second region corresponding to the first region in the obstruction-free first image at corresponding locations in the aligned obstruction-free second image, and
obtain a reconstructed obstruction-free first image by reconstructing the first region in the first sensor image and the obstruction-free first image by using the aligned second sensor image and the aligned obstruction-free second image.

9. The electronic device as claimed in claim 8, further comprising:
a display configured to:
display the reconstructed obstruction-free first image on a screen of the electronic device upon at least one of completion of the capturing of the first sensor image and the second sensor image of the scene or during a camera preview of the scene, and
display a modified reconstructed obstruction-free first image on a screen of the electronic device in response to a received user input to modify a portion of the reconstructed obstruction-free first image.

10. The electronic device as claimed in claim 8, wherein to generate the obstruction-free first image and the first intermediate image using the first sensor image, the first DNN of the image reconstruction controller is further configured to:
receive the first sensor image; and
generate the obstruction-free first image and a first intermediate image,
wherein to generate the obstruction-free second image and the second intermediate image using the second sensor image, the first DNN of the image reconstruction controller is further configured to:
receive the second sensor image; and
generate the obstruction-free second image and the second intermediate image.

11. The electronic device as claimed in claim 8,
wherein the aligned obstruction-free second image comprises pixels aligned in position with respective pixels in the obstruction-free first image, and
wherein the pixels aligned in the aligned obstruction-free second image and the respective pixels in the obstruction-free first image correspond to one of visible information in the scene or a hidden pixel in the obstruction-free first image with corresponding pixel visible in the aligned obstruction-free second image.

12. The electronic device as claimed in claim 8,
wherein the aligned second sensor image comprises pixels aligned in position with respective pixels in the first sensor image, and
wherein the pixels aligned in the aligned second sensor image and the pixels in the first sensor image correspond to one of visible information in the scene or a hidden pixel in the first sensor image with corresponding pixel visible in the aligned second sensor image.

13. The electronic device as claimed in claim 8, wherein to determine the first region in the first sensor image and the obstruction-free first image using the aligned second sensor image and the aligned obstruction-free second image respectively, the second DNN of the image reconstruction controller is further configured to:
receive the aligned first sensor image, the aligned second sensor image, the aligned first obstruction-free image, the aligned second obstruction-free image, and the first intermediate image as inputs, and
determine the second region in the obstruction-free first image by referring to the aligned obstruction-free second image, and the first region in the first sensor image by referring to the aligned second sensor image, wherein the second region in the obstruction-free first image and the first region in the first sensor image are determined using the first intermediate image as guidance.

14. The electronic device as claimed in claim 8, wherein to obtain the reconstructed obstruction-free first image by reconstructing the first region in the first sensor image and the obstruction-free first image by using the aligned second sensor image and the aligned obstruction-free second image, the second DNN of the image reconstruction controller is further configured to:

determine visible pixels in the obstruction-free second image and the second sensor image corresponding to the second region in the obstruction-free first image, wherein the second region in the obstruction-free first image is identified using the first intermediate image, copy content from the visible pixels in the aligned obstruction-free second image and the second sensor image to the second region of the obstruction-free first image and the first sensor image, and obtain the reconstructed obstruction-free first image based on the copied content in the obstruction-free first image.

\* \* \* \* \*